US005998793A

United States Patent [19]

Shao et al.

[11] Patent Number: 5,998,793

[45] Date of Patent: Dec. 7, 1999

[54] METHOD AND APPARATUS FOR CORRECTING FOR RANDOM COINCIDENCES IN A NUCLEAR MEDICINE IMAGING SYSTEM

[75] Inventors: Lingxiong Shao, San Jose; David Coles, San Francisco, both of Calif.

[73] Assignee: ADAC Laboratories, Milpitas, Calif.

[21] Appl. No.: 09/062,226

[22] Filed: Apr. 17, 1998

[51] Int. Cl.[6] ........ G01T 1/20

[52] U.S. Cl. ........ 250/369; 250/366; 250/363.03

[58] Field of Search ........ 250/369, 366, 250/363.03

[56] References Cited

U.S. PATENT DOCUMENTS

| | | | |
|---|---|---|---|
| 4,071,761 | 1/1978 | Horrocks . | |
| 4,181,855 | 1/1980 | Horrocks . | |
| 4,418,282 | 11/1983 | Horrocks . | |
| 4,599,690 | 7/1986 | Stoub . | |
| 5,296,708 | 3/1994 | Moyers et al. . | |
| 5,444,252 | 8/1995 | Hug et al. . | |
| 5,461,232 | 10/1995 | McCandless et al. . | |
| 5,471,061 | 11/1995 | Moyers et al. . | |
| 5,552,606 | 9/1996 | Jones et al. . | |
| 5,565,684 | 10/1996 | Gullberg et al. . | |
| 5,585,637 | 12/1996 | Bertelsen et al. . | |
| 5,608,221 | 3/1997 | Bertelsen et al. . | |
| 5,760,401 | 6/1998 | Nelleman et al. | 250/369 |
| 5,834,779 | 11/1998 | Shao et al. | 250/369 |

OTHER PUBLICATIONS

Robert Anthony Dekemp, B.A.Sc., Attenuation Correction in Positron Emission Tomography Single Photon Transmission Measurement, Sep. 1992, Hamilton (ON), 106 Pgs.

Siu K. Yu and Claude Nahmias, Single Photon Transmission Measurements in Positron Tomography Using$^{137}$Cs, 1995, Hamilton (ON), 29 Pgs.

Karp et al., Singles Transmissioin In Positron Emission Tomography Using$^{137}$Cs, from 1995 IEEE Nuclear Science Symposium and Medical Imaging Conference record vol. 13, University of Pennsylvania and UGM Medical Systems (Philadelphia, PA), pp. 1363–1367.

P. Nellemann, et al., Performance Characteristics of a Dual Head Spect Scanner with Pet Capability, From 1995 IEEE Nuclear Science Symposium conference record vol. 3, ADAC Laboratories and UGM Laboratory, pp. 1751–1755.

Karp, et al. Singles Transmission in Volume–Imaging Pet with A $^{137}$Cs Source, *Phys. Med. Biol.*, vol. 40, 1995, University of Pennsylvania and UGM Medical Systems (Philadelphia, PA), pp. 929–944.

(List continued on next page.)

*Primary Examiner*—Constantine Hannaher
*Assistant Examiner*—Andrew Israel
*Attorney, Agent, or Firm*—Blakely, Sokoloff, Taylor & Zafman LLP

[57] ABSTRACT

A method and apparatus for correcting for random coincidences in a gamma camera imaging system are provided, based on the distribution of the object to be imaged as well as the measured singles and coincidence rates. Gamma radiation emitted from the object is detected for multiple projection angles, including detection of a plurality of coincidence events, to generate an object profile. The singles rate and the coincidence rate are also measured for each of the projection angles. A randoms distribution representing random coincidences in the detected coincidence events is then determined, including computing a randoms profile as the convolution of the object profile and a Gaussian function. The determination of the randoms distribution further includes computing a randoms fraction for each of the projection angles based on the measured singles rate and the measured coincidence rate, and then computing the randoms distribution based on the randoms profile and the randoms fraction for each of the projection angles. The coincidence projection data are corrected based on the randoms distribution prior to generating emission images.

14 Claims, 16 Drawing Sheets

11
16
10
Y
12
14
18
PROCESSING SYSTEM
Θ
X
10
16
Z
11

OTHER PUBLICATIONS

Bailey, et al, Ecart Art–A Continuously Rotating Pet Camera:Performance Characteristics, Initial Clinical Studies, and Installation Considerations in a Nuclear Medicine Department, *European Journal of Nuclear Medicine*, vol. 24, No. 1, Jan. 1997, London (UK) and Knoxville (TN), 10 pgs.

Robert A. De Kemp, et al. Attenuation Correction in Pet using Single Photon Transmission Measurement, *Med. Phys.*, vol. 21, No. 6, Jun. 1994, Hamilton (ON), pp. 771–778.

G. Muehllehner, et al., "Performance Parameters of a Positron Imaging Camera," IEEE Transactions on Nuclear Science, vol.NS–23, No. 1, Feb. 1976, Des Plains(IL), pp. 528–537.

R.A. De Kemp, et al. Design and Performance of 3D Photon Transmission Measurement on a Positron Tomograph with Continuously Rotating Detectors, International Meeting on Fully Three–Dimensional Image Reconstruction in Radiology and Nuclear Medicine, 1995, Ottowa and Hamilton (ON), Knoxville (TN), pp. 51–54.

Gerd Muehllehner, Positron Camera with Extended Counting Rate Capability, *Journal of Nuclear Medicine*, vol. 15, No. 7, Jul. 1975, Des Plaines (IL), pp. 653–657.

Karp, et al., Continuous–Slice Penn–Pet: A Positron Tomograph with Volume Imaging Capability, *Journal of Nuclear Medicine*, vol. 31, No. 5, May 1990, Philadelphia (PA), pp. 617–627.

R.J. Smith et al., "Singles Transmission Scans Performed Post–Injection for Quantitative Whole Body PET Imaging," IEEE Nuclear Science Symposium Conference Record, vol. 3, Nov. 1996, Philadelphia (PA), 7 Pgs.

Karp, et al., Abstract No. 156 From proceedings of the 41st Annual Meeting, Scientific Papers, vol. 35, No. 5, Attenuation Correction in Pet Using A Singles Transmission Source, May 1994, Philadelphia (PA), p. 41P.

G. Muehllehner, et al. Abstract No. 284, From proceedings of the 42nd Annual Meeting, Scientific Papers, Spect Scanner with Pet Coincidence Capability, *Journal of Nuclear Medicine*, Jun. 14, 1995, Philadelphia (PA), p. 70P.

James A. Sorenson, Ph.D. et al., *Physics in Nuclear Medicine*, W.B. Saunders Company, 2nd Ed., Philadelphia, 1987, pp. 252–259, 332–340, 443, 438–442, 451.

R.J. Smith and J.S. Karp, "Post injection Transmission Scanning in a Volume Imaging PET Camera", *IEEE Transactions on Nuclear Science*, vol. 41, No. 4, Aug. 1994, pp. 1526–1531.

R.J. Smith and J.S. Karp, "Simultaneous Post–Injection Transmission and Emission Contamination Scans in a Volume Imaging PET Scanner", *IEEE Nuclear Science Symposium and Medical Imaging Conference Records*, vol. 3, 1995, pp. 1781–01785.

METHOD AND APPARATUS FOR CORRECTING FOR RANDOM COINCIDENCES IN A NUCLEAR MEDICINE IMAGING SYSTEM

FIELD OF THE INVENTION

The present invention pertains to the field of medical imaging. More particularly, the present invention relates to correcting for random coincidences in a gamma camera imaging system.

BACKGROUND OF THE INVENTION

In nuclear medicine, images of internal structures or functions of the body are acquired by using gamma cameras to detect radiation emitted by a radio-pharmaceutical that has been injected into the patient's body. A computer system controls the gamma camera to acquire data and then processes the acquired data to generate the images. Nuclear medicine imaging techniques include single-photon emission computed tomography (SPECT) and positron emission tomography (PET). SPECT imaging is based on the detection of individual gamma rays emitted from the body, while PET imaging is based on the detection of gamma ray pairs emitted in coincidence in opposite directions due to electron-positron annihilations. Accordingly, PET imaging is sometimes referred to as coincidence imaging.

One factor which has an impact on image quality in coincidence imaging is the detection of random coincidences. In PET imaging systems, coincidence events are normally identified as two events observed by two separate detectors 180 degrees apart which occur within a relatively narrow time window. However, a certain percentage of event pairs detected within the time window are not the result of a true coincidence event (i.e., based on a single positron-electron annihilation), but are based on separate, unrelated annihilation events. Such detected event pairs are referred to as random coincidences, or simply "randoms". The misinterpretation of randoms as true coincidences contributes to inaccuracies in the imaging process and therefore degrades image quality.

One known technique for performing randoms correction is a direct measurement approach. In particular, a secondary timing circuit may be provided in parallel with the primary coincidence timing circuit, with a time delay applied to the signal from one detector. The delay is made large enough so that no true coincidence events are registered in the secondary timing circuit. As a result, events which are detected in the secondary timing circuit can result only from random coincidences. Such events are then subtracted from the set of all detected coincidences. One problem with this technique, however, is that it tends to be implemented by providing additional hardware, which adds to the complexity, cost, and size of the gamma camera system. In addition, the randoms data tends to be noisy, because the total number of coincidences generally represent only a small percentage of the overall countrate. Another approach is to estimate the randoms using a mathematical model. However, mathematical models created thus far have not accounted for spatial variations in randoms due to variations in patient size and shape. Therefore, what is needed is a technique for correcting for randoms in a gamma camera system which overcomes these and other disadvantages of the prior art.

SUMMARY OF THE INVENTION

The present invention includes a method and apparatus for correcting for random coincidences in an imaging system. Data for generating an image of an object are acquired by detecting radiation from the object, including detecting coincidence events. A singles rate and a coincidence rate associated with the detected radiation are measured, and random coincidence data are generated based on both the singles rate and the coincidence rate. The data for generating an image are then corrected based on the random coincidence data.

In another aspect of the present invention, an object distribution is determined based on the detected coincidence events, and the random coincidence data is generated based on the object distribution. In yet another aspect of the present invention, the random coincidence data is generated based upon an object distribution as well as measured singles and coincidence rates. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for correcting for random coincidences in a gamma camera imaging system are described.

In the following description, for purposes of explanation, numerous specific details are set forth in order to provide a thorough understanding of the present invention. It will be evident to one skilled in the art, however, that the present invention may be practiced without these specific details. In other instances, well-known structures and devices are shown in block diagram or other symbolic form in order to facilitate description of the present invention.

I. Overview

Figure 1:
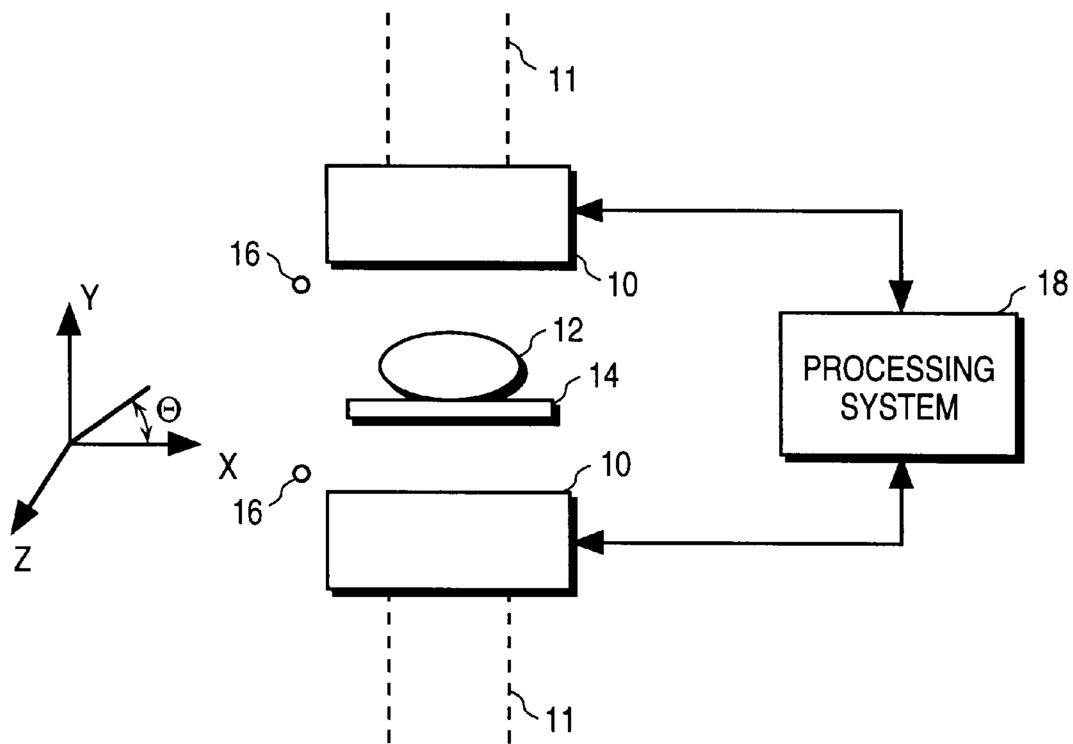
FIG. 1 illustrates a dual-detector gamma camera imaging system.

In certain embodiments, the present invention may be implemented in a dual-detector gamma camera system that is capable of both PET and SPECT imaging. Such systems are available from ADAC Laboratories of Milpitas, Calif. FIG. 1 illustrates a block diagram of one such system. Although the illustrated system is a dual-detector system, note that the present invention is not limited to implementation in a dual-detector system, nor is the present invention limited to a system that can perform both PET and SPECT imaging. The gamma camera system of FIG. 1 includes a processing system 18 coupled to two scintillation detectors 10. The detectors 10 are mounted to a gantry 11, which can rotate the detectors 10, either individually or in unison, about an axis of rotation that is perpendicular to the x–y plane (parallel to the z axis). The detectors 10 are shown in FIG. 1 configured in a 180 degree orientation relative to each other about the axis of rotation, such as may be used for coincidence imaging. A patient 12 rests on a table 14 positioned between the detectors 10. Each of the detectors 10 includes a scintillation crystal, an array of photomultiplier tubes (PMTs) optically coupled to the crystal, and appropriate processing circuitry coupled to receive and process the outputs of the PMTs and to provide the processed outputs to the processing system 18.

The gamma camera system also includes two transmission radiation point sources 16, which are positioned slightly outside the fields of view (FOVs) of the detectors 10. The point sources generally are used for transmission scanning for purposes of acquiring an attenuation map of the patient 12. Each of the point sources 16 is mounted so as to be rotatable about the axis of rotation in unison with an opposing detector 10. In one embodiment, each of the point sources 16 is a Cesium (Cs-137) 662 keV source. Each source 16 is configured to transmit radiation to the opposing detector in a fan beam profile. The transmission sources 16 may be used for transmission imaging for correction of either coincidence or SPECT emission data, as will be described further below.

The processing system 18 controls the overall operation of the gamma camera system, including receiving data acquired by the detectors 10, reconstructing images based on the acquired data, controlling the gantry 11 to appropriately position the detectors 10, and controlling the imaging mode (PET or SPECT) of the detectors 10 based on a user command. Note that in alternative embodiments, however, some of the above-mentioned functions or aspects thereof may be implemented within the detectors 10, the gantry 11, or in separate modules.

Figure 2:
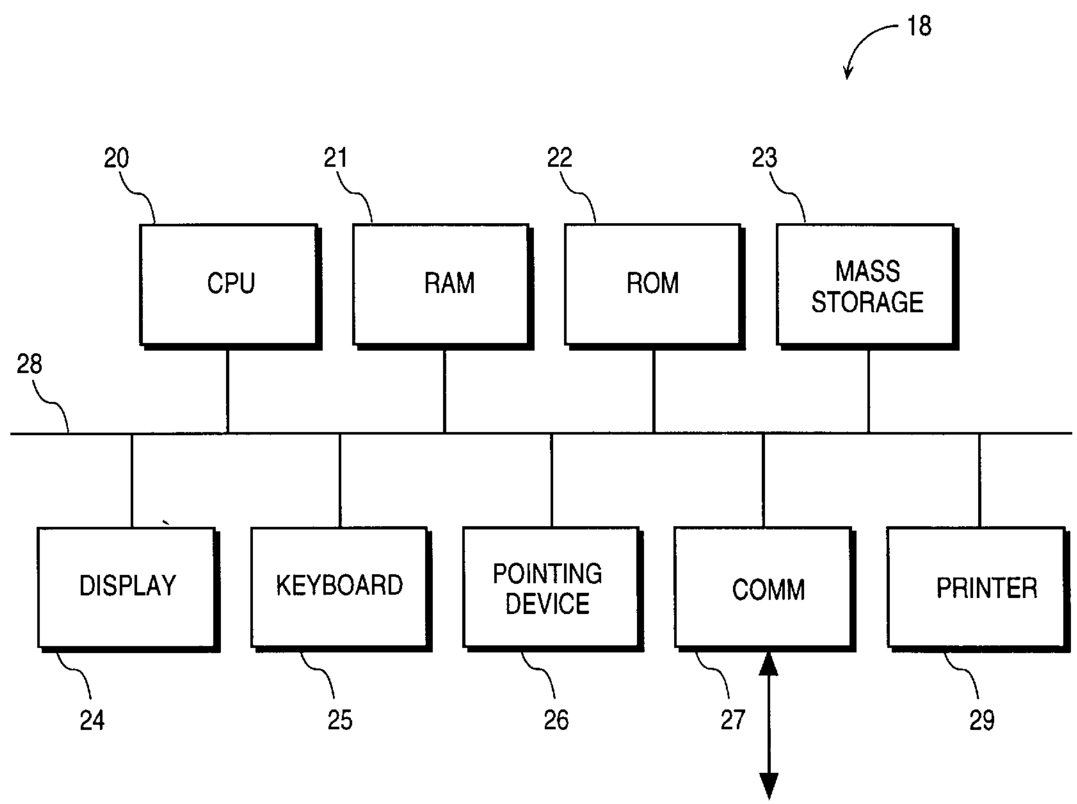
FIG. 2 illustrates the processing system of the gamma camera system of FIG. 1, according to one embodiment.

The processing system 18 may be, or may include, a conventional computer system, such as a personal computer (PC), a server and workstation, a single-board computer, etc. FIG. 2 illustrates a block diagram of processing system 18 according to one such embodiment. Note, however, that the specific architecture of processing system 18 is not important for purposes of practicing the present invention. In the illustrated embodiment, the processing system 18 includes a central processing unit (CPU) 20, random access memory (RAM) 21, read-only memory (ROM) 22, and a mass storage device 23, each coupled to a bus system 28. The bus system 28 may represent multiple physical buses coupled together by appropriate bridges, controllers, and/or adapters. Also coupled to the bus system 28 are a display device (including controller) 24, which may be a cathode ray tube (CRT), liquid crystal display (LCD), or the like; a keyboard 25; a pointing device 26, such as a mouse, trackball, touchpad, or the like; a data communication device 27; and a printer 29. Data communication device 27 may be used by processing system 18 to communicate with the detectors 10 and/or other computer systems or components and may be, for example, a network adapter, a modem, or any other suitable data communication device. Display device 24 and printer 29 may be used to display and print, respectively, tomographic images reconstructed by processing system 18.

It should be noted at this point that some or all aspects of the present invention may be embodied in software. That is, the present invention may be carried out, at least in part, in a computer system, such as processing system 18, in response to its CPU executing sequences of instructions contained in memory. The instructions may be executed from RAM, ROM, a mass storage device, or a combination thereof. In certain embodiments, hardwired circuitry may be used in place of, or in combination with, software instructions to implement the present invention. Thus, the present invention is not limited to any specific combination of hardware circuitry and software, nor to any particular source of any such software.

Figure 3:
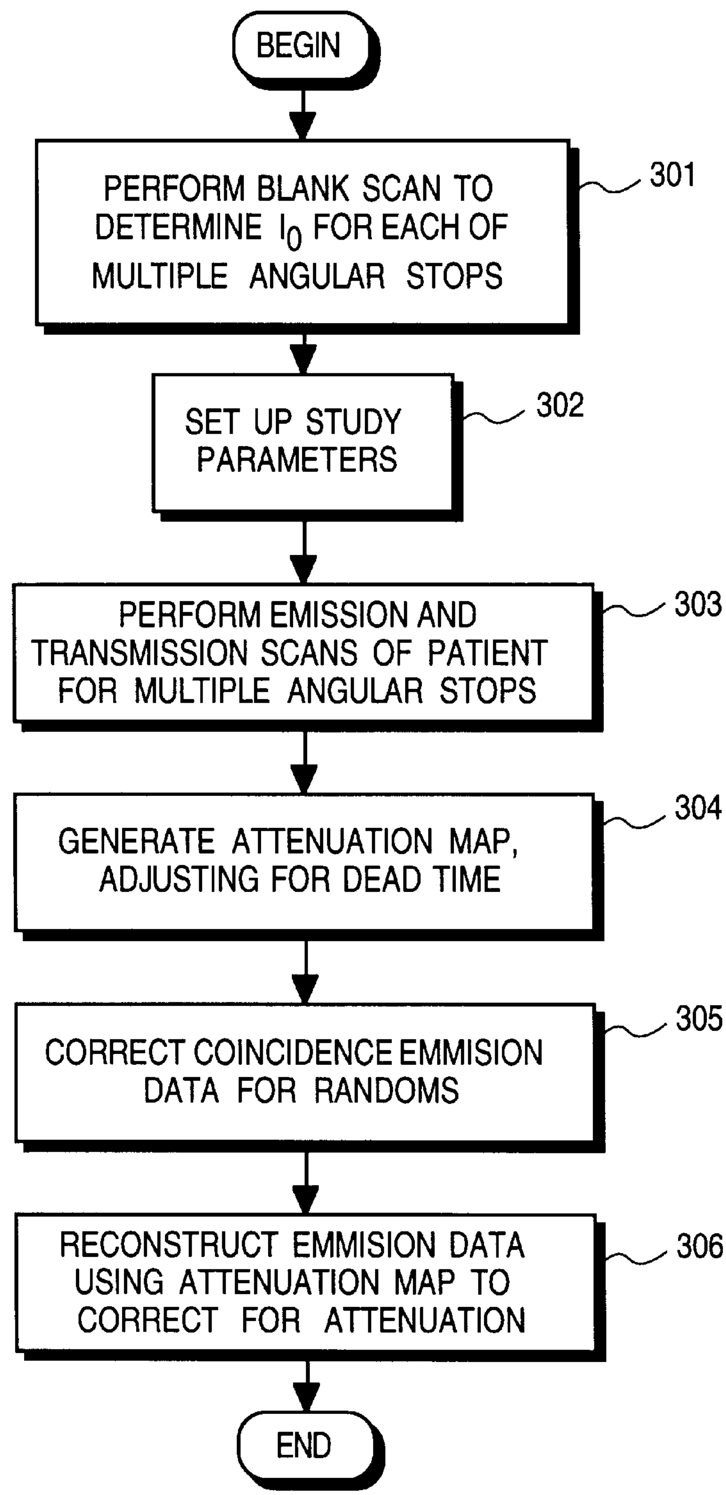
FIG. 3 is a flow diagram illustrating an overall routine for generating attenuation-corrected coincidence emission images of a patient.

It is useful now to briefly consider the overall process associated with imaging a patient. Accordingly, FIG. 3 illustrates an overall routine for acquiring coincidence emission data and for generating images from that data. Note that while the routine of FIG. 3 relates to coincidence imaging, aspects of the present invention are also applicable to SPECT imaging and associated transmission scans, as will be apparent to those skilled in the art. Note also that many variations upon the routine of FIG. 3 are possible without departing from the scope of the present invention.

Referring now to FIG. 3, at 301 a blank (reference) transmission scan is performed to determine a reference intensity level $I_0$ for each of the angular positions. A "blank" transmission scan is a transmission scan performed without a patient or table present and may be performed in a pre-clinical test setting. In general, the data from one blank scan can be used in imaging studies of multiple patients. However, it may be desirable to perform a new blank transmission scan periodically (e.g., every few months) to account for drift in system parameters. At 302, in a clinical setting, initial study parameters are set up in processing system 18. These parameters may include, for example, the imaging mode (i.e., PET or SPECT, emission or transmission scan, etc.), the initial configuration of the detectors, the total number of angular positions about the axis of rotation, the total acquisition time at each position, etc. Next, the detectors are configured in the 180 degree orientation relative to each other about the axis of rotation. Next, at 303, emission and transmission scans of the patient are performed for each of the angular positions. Note that the emission and transmission scans may be performed either simultaneously or sequentially. At 304, processing system 18 generates an attenuation map from the transmission data, which is corrected for deadtime. At 305, the processing system 18 corrects the coincidence emission data for randoms, and at 306 the processing system reconstructs the randoms-corrected emission data to generate a set of tomographic images, using the deadtime-corrected attenuation map to correct the emission data for non-uniform attenuation.

II. Deadtime Correction

The deadtime correction technique of the present invention requires no knowledge of the singles countrate and requires no a priori knowledge about particular detector characteristics. It is well-known that the measured radiation intensity level I at a depth $\vec{d}$ within an attenuating material can be represented as set forth in equation (1):

$$I = I_0 e^{-\int \mu \vec{d}} \tag{1}$$

where $\mu$ is the attenuation coefficient of the attenuating material and $I_0$ is the measured incident intensity of the radiation upon the attenuating material. From equation (1), we have:

$$\int \mu \vec{d} = 1n[I_0/I] \tag{2}$$

However, equation (2) is not entirely accurate in a system that is subject to deadtime losses. Accordingly, we may rewrite equation (2) for a system which has deadtime losses as equation (3), where $D_0$ is an appropriate correction factor to correct the blank scan for deadtime losses, and D is an appropriate correction factor to correct the transmission scan with the patient present for deadtime losses.

$$\int \mu \vec{d} = \ln\left[\frac{I_0 \cdot D_0}{I \cdot D}\right] \tag{3}$$

Since I and $I_0$ are measured values, an attenuation map of the patient can be corrected for deadtime losses by determining the ratio $$\frac{D_0}{D}.$$

Figure 4:
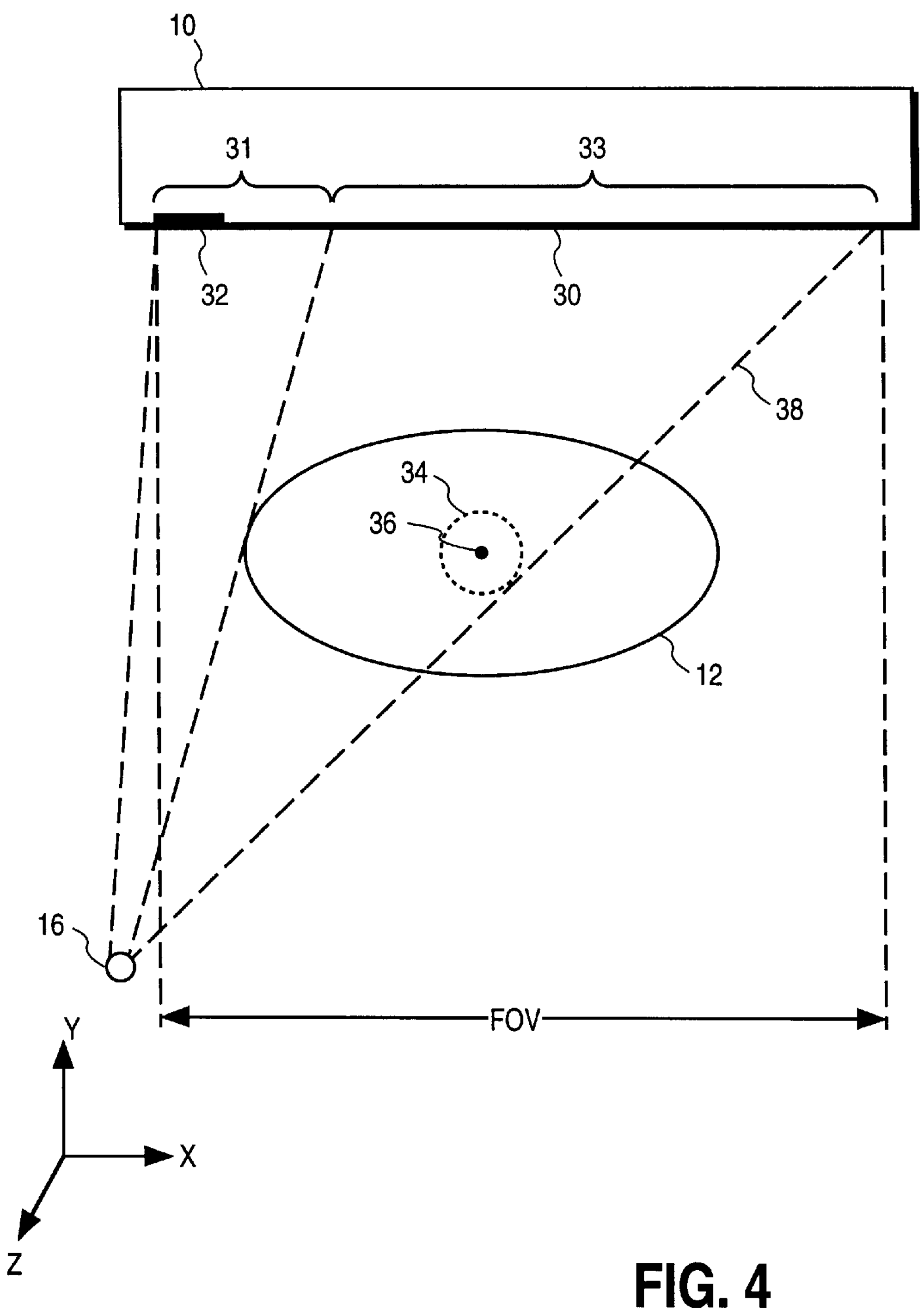
FIG. 4 illustrates a point source transmitting a fan beam to a detector and a sample area defined on the imaging surface of the detector.

It is useful now to consider the gamma camera system of FIG. 1 in greater detail. FIG. 4 illustrates one of the detectors 10 and a corresponding one of the point sources 16, with the patient 12 positioned between the detector 10 and the point source 16. In one embodiment, point source 16 is a Cs-137 source configured to transmit 662 keV gamma radiation in a fan beam 38, such that the transaxial (x) width of the fan beam 38 at the imaging surface 30 of detector 10 essentially matches the transaxial FOV of the detector 10. The width of the fan beam 38 is chosen to be relatively narrow in the axial (z) direction. In contrast with certain prior art systems, such as discussed above, the point source 16 does not move physically across the FOV of the corresponding detector 10, but instead remains positioned outside the FOV. The fan beam 38 may be scanned axially across the imaging surface 30 of detector 10 by moving source 16 laterally outside the FOV or by selectively varying collimation (not shown) at source 16.

With the configuration of FIG. 4, a portion 33 of the imaging surface 30 will fall within the radiation "shadow" of the patient 12, whereas another portion 31 of the imaging surface 30 will not fall within the radiation shadow and will therefore receive radiation from source 16 at full intensity. This is true for each angular position of the detector 10. The deadtime correction technique of the present invention is based upon the assumption that the intensity level I measured in region 31 should be identical to the intensity level $I_0$ measured during the reference scan after both intensity levels have been corrected for deadtime losses. This assumption, therefore, can be used to determine the ratio $$\frac{D_0}{D},$$

as will now be described.

In accordance with the present invention, a sample area is defined as a portion 32 of the imaging surface 30 of each detector 10 at the edge of the transaxial FOV closest to the source 16. The sample area 32 is selected to be a region of the imaging surface 30 upon which the radiation shadow of the patient is least likely to fall during an imaging session, or is substantially less likely to fall than other regions of the imaging surface 30. Accordingly, let the deadtime-corrected transmission intensity at a given angle measured in sample area 32 during the blank scan be represented as $I_{0,SA} \cdot D_{0,SA}$. Similarly, let the deadtime-corrected transmission intensity at that angle measured in sample area 32 when the patient is present be represented as $I_{SA} \cdot D_{SA}$. Thus, the above assumption can be represented by equation (4).

$$I_{SA} \cdot D_{SA} = I_{0,SA} \cdot D_{0,SA} \tag{4}$$

From equation (4), we have:

$$\frac{D_{0,SA}}{D_{SA}} = \frac{I_{SA}}{I_{0,SA}} \tag{5}$$

We can use equation (5) to substitute $$\frac{I_{SA}}{I_{0,SA}}$$

for the quantity $$\frac{D_0}{D}$$

in equation (3). Therefore, the present invention provides that the ratio of the intensity level $I_{SA}$ in the sample area 32 during a patient scan to the intensity level $I_{0,SA}$ measured in the sample area 32 during the reference scan is used as a deadtime correction factor for correcting the transmission map of the patient. This ratio may be determined for one angular position and then applied uniformly to the entire transmission map. Alternatively, separate ratios can be determined for each angular position and applied individually to the transmission map. The latter approach is believed to be more accurate.

Note that the above-described technique generally is based on the assumption that deadtime losses are uniform across the imaging surface of the detector. Because that assumption may not hold, however, the present invention also includes a technique to correct for local variations in deadtime losses across the imaging surface of a detector, as will be described below.

Figure 5A:
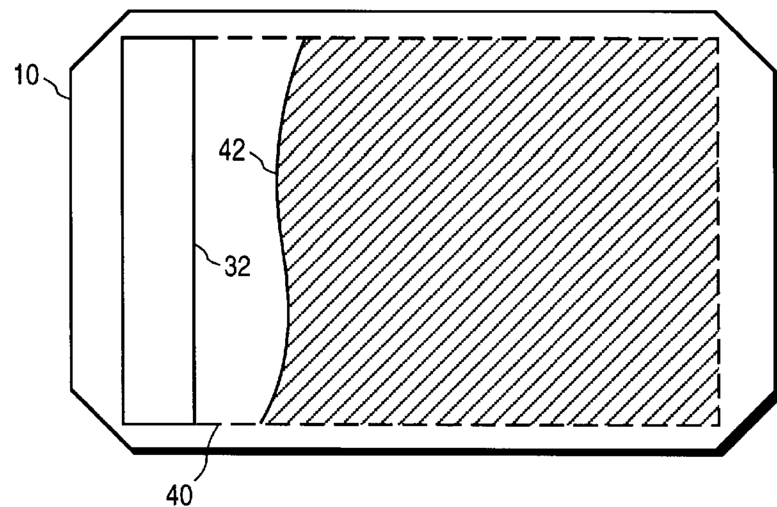
FIGS. 5A, 5B, and 5C illustrate sample areas defined on the imaging surface of a detector according to three alternative embodiments.
Figure 5B:
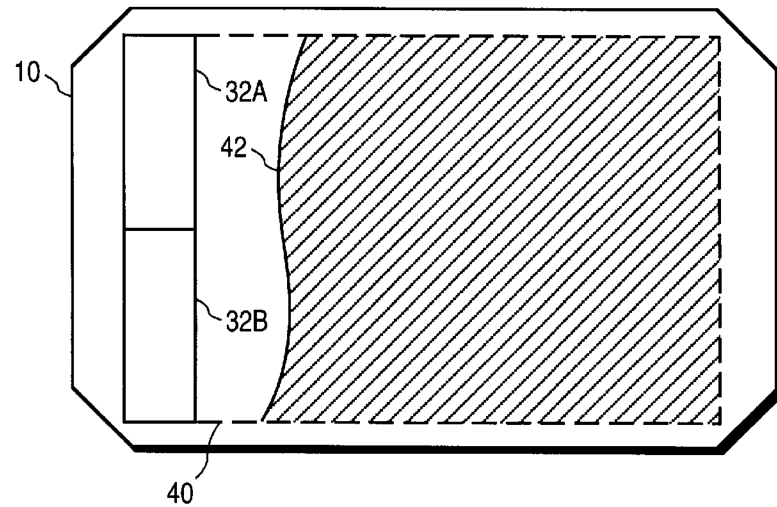
Figure 5C:
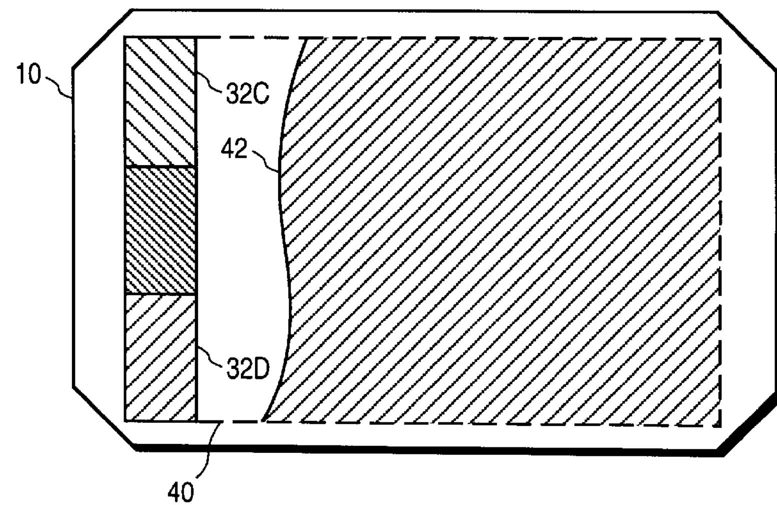

Refer now to FIGS. 5A through 5C, which illustrate a detector 10 viewed perpendicular to its imaging surface. As shown, the sample area 32 can be defined along the edge of the transaxial FOV 40 of the detector 10. In the embodiment of FIG. 5A, the sample area 32 is defined along the entire axial field of view of detector 10. As noted, the sample area 32 is defined such that the radiation shadow 42 of the patient will not cover (or will rarely cover) the sample area 32. In certain instances, such when scanning an extremely large patient, the radiation shadow may, in fact, fall upon the sample area 32 for certain angular positions. Accordingly, an alternative approach, illustrated in FIG. 5B, is to define two (or more) separate sample areas 32*a* and 32*b* adjacent to each other axially at the edge of the transaxial FOV of the detector 10. Thus, even if the patient's radiation shadow falls upon one of the sample areas for a given angular position, it is likely that the shadow will not also fall upon the other sample area at the same time, because a patient's body contour tends to be irregular. Accordingly, for each angle, the greater of the intensities measured in each of sample areas 32*a* and 32*b* is taken as the intensity level $I_{SA}$ for purposes of computing the deadtime correction factor. Numerous other approaches to defining one or more sample areas are possible within the scope of the present invention. FIG. 5C, for example, shows yet another embodiment, in which two sample areas 32*c* and 32*d* are defined to overlap.

Figure 6:
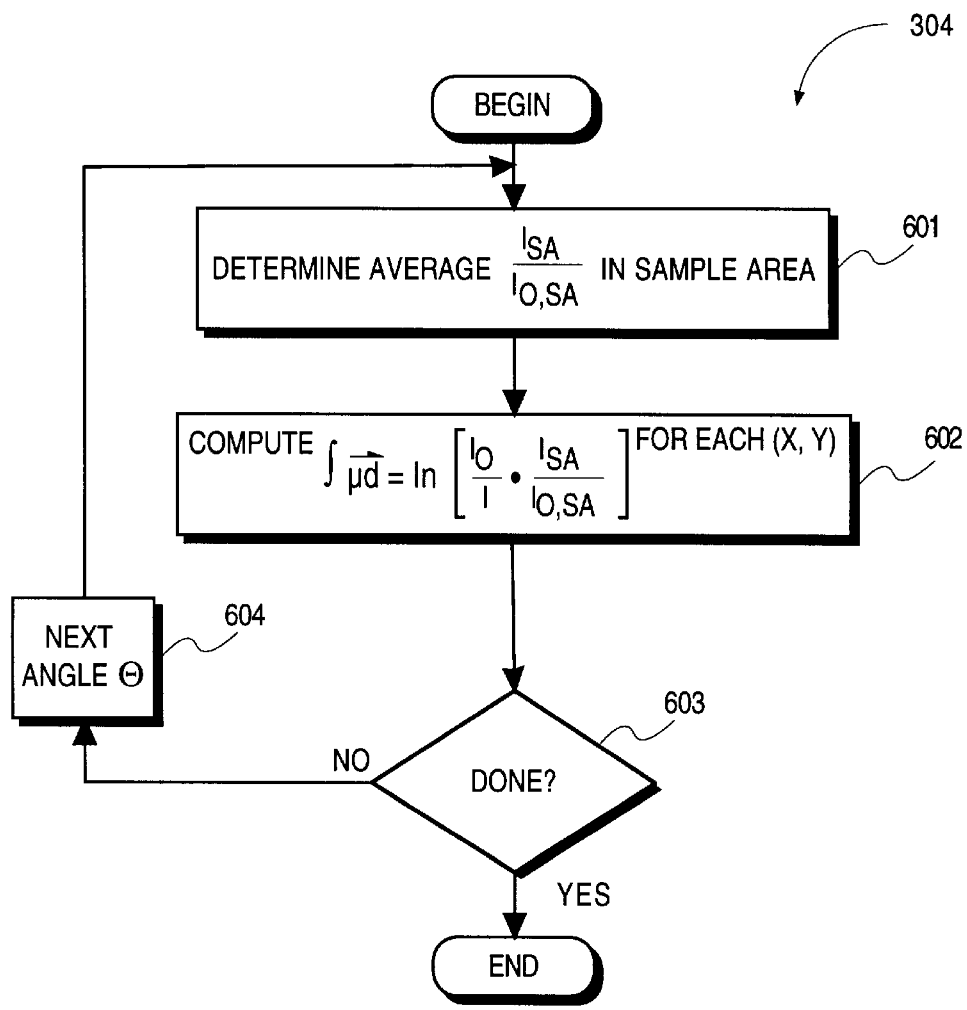
FIG. 6 is a flow diagram illustrating a routine for correcting an attenuation map for deadtime.

FIG. 6 illustrates a routine for correcting an attenuation map of the patient according to the above-described technique. More specifically, the routine of FIG. 6 illustrates in greater detail part 304 of the routine of FIG. 3. Note that the following routine is performed independently for each detector. Initially, at 601 the average ratio $$\frac{I_{SA}}{I_{0,SA}}$$

inside the sample area is determined for a given angle θ. A single computation of this ratio may be used for all angles, as noted above. However, the routine of FIG. 6 makes a separate computation for each angle. Next, at 602 the appropriate attenuation coefficient $\int \mu \vec{d}$ is determined according to equations (3) and (5) for each (x,y) position. If there are additional angles to be considered at 603, then the next angle is selected at 604, and the routine repeats from 601; otherwise, the routine ends. Thus, an attenuation map generated as described above is appropriately corrected for deadtime.

As noted above, the foregoing technique assumes that the deadtime is uniform across the imaging surface of the detector. That assumption, however, may not be correct. If the detector deadtime varies along the imaging surface of the detector, then the sampling at the outer edge of the transaxial FOV of a detector may not represent the deadtime on the other side of the transaxial FOV, which samples the center of the object. Small data errors in projection data representing the center of the object can cause substantial artifacts in the reconstructed image.

Refer again to FIG. 4, which shows the axis of rotation 36 of the detectors 10. The axis of rotation 36 is included within a center region 34. Center region 34 is defined by the inner edge of the fan beam 38 (i.e., the edge toward the right side the FIG. 4 for the illustrated orientation) for all angular positions in aggregate. Note that the center region 34 will be sampled by the inner edge of the transaxial FOV of the detector 10. (In certain systems, the center region 34 may be covered by supplementing rotation of the detectors 10 with appropriate motion of the table 14 to extend the transaxial FOV, if necessary.) However, because the illustrated system is a dual-detector system in which the detectors 10 are rotated about the patient, the center region 34 can be covered twice by each detector after 360 degrees of rotation of the detector.

Figure 7:
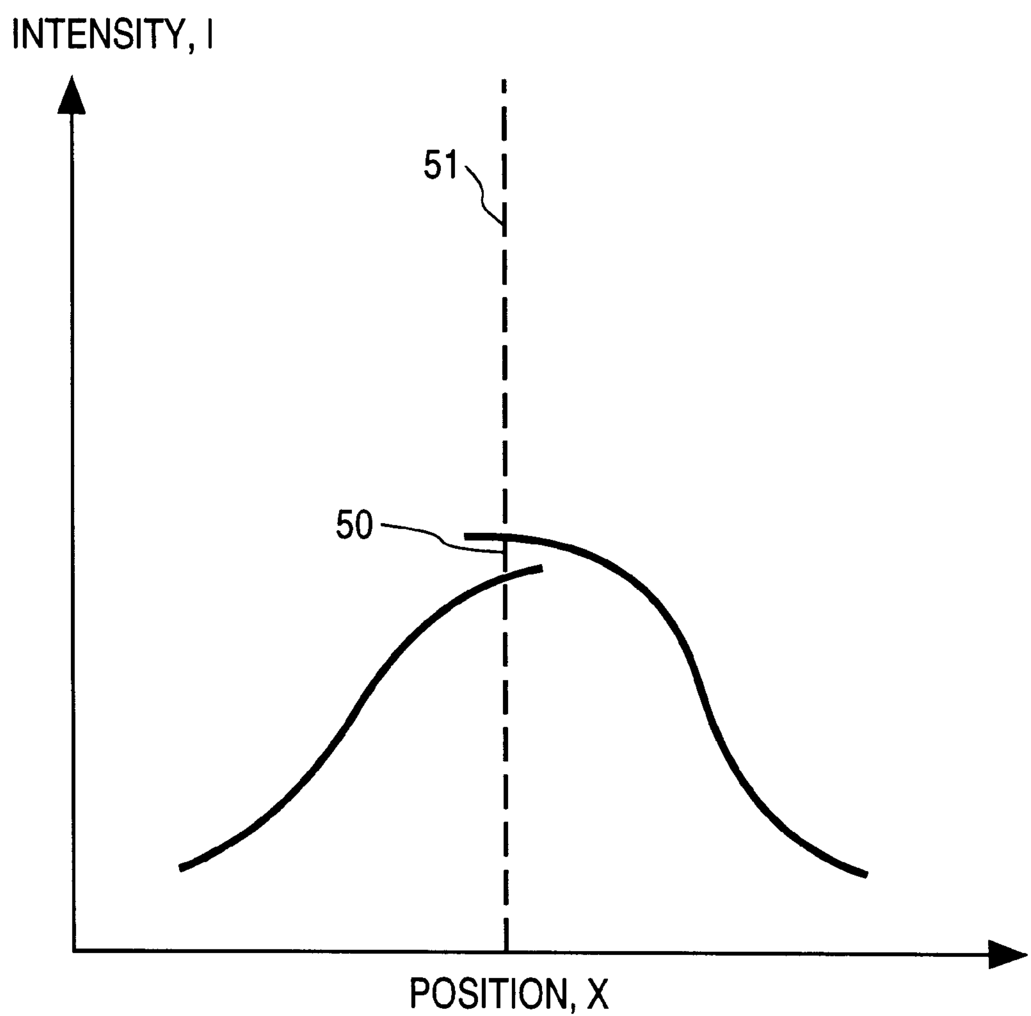
FIG. 7 illustrates projection data of an object with a discontinuity in the data.

Because the center region 34 can be covered twice by each detector, the data acquired the first time it is covered by a detector should be the same as the data acquired the second time it is covered by the detector, if there is no variation in deadtime across the imaging surface of the detector. Referring to FIG. 7, which shows a sample projection, any discrepancy between the two samplings of the center region 34 may appear as a discontinuity 50 at the center 51 of the projection. Again, such a discontinuity may cause substantial artifacts in the reconstructed image. In accordance with the present invention, such discontinuities are corrected generally by averaging values in sinogram space which represent a discontinuity and then recomputing those values based on the average. Thus, the discontinuity is smoothed by such a technique, eliminating or reducing the severity of artifacts in the reconstructed image. This procedure is performed for all projections and for all transaxial slices. Consequently, this procedure corrects for certain local variations in deadtime along the imaging surface of a detector.

Figure 8:
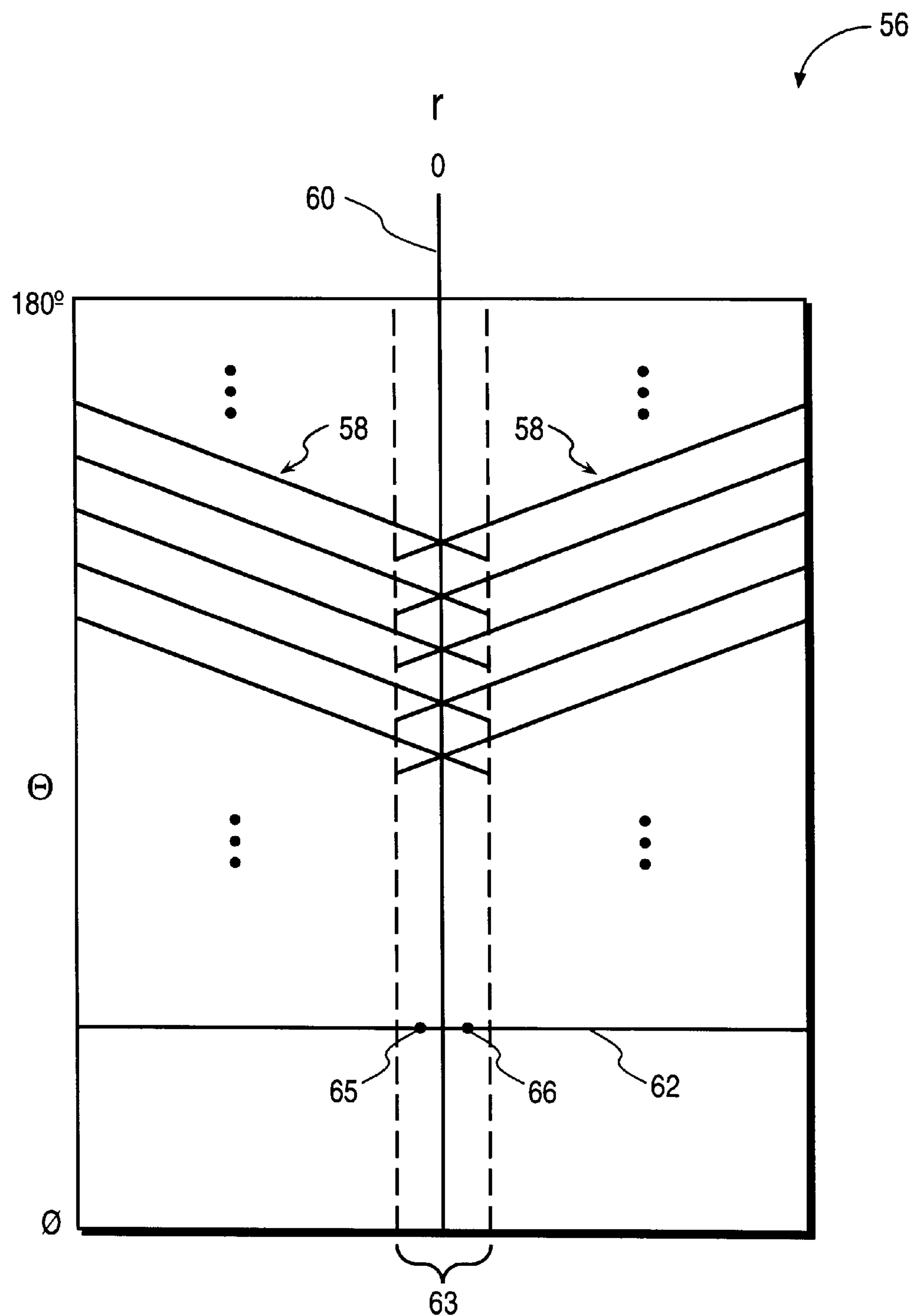
FIG. 8 illustrates aspects of a sinogram of transmission data of an object.

FIG. 8 illustrates the format of a sinogram 56 of an object. In the dual rotating detector system described above, each detector acquires data along each of a number of diagonal lines 58 during a transmission scan. Each diagonal line 58 on the left side of sinogram 56 represents data acquired by a detector while the detector is at a particular angular position, while the corresponding diagonal line 58 on the right side of sinogram 56 represents data acquired by the same detector when positioned at the 180 degrees opposite angular position. Centerline 60 of sinogram 56 corresponds to the axis of rotation 36 of the detectors 10 (FIG. 4). Similarly, the center strip 63 of the sinogram 56 corresponds to center region 34. The diagonal lines 58 of data extend beyond centerline 60, because the inner edge of the transmission fan beam 38 extends beyond the axis of rotation 36.

Figure 9:
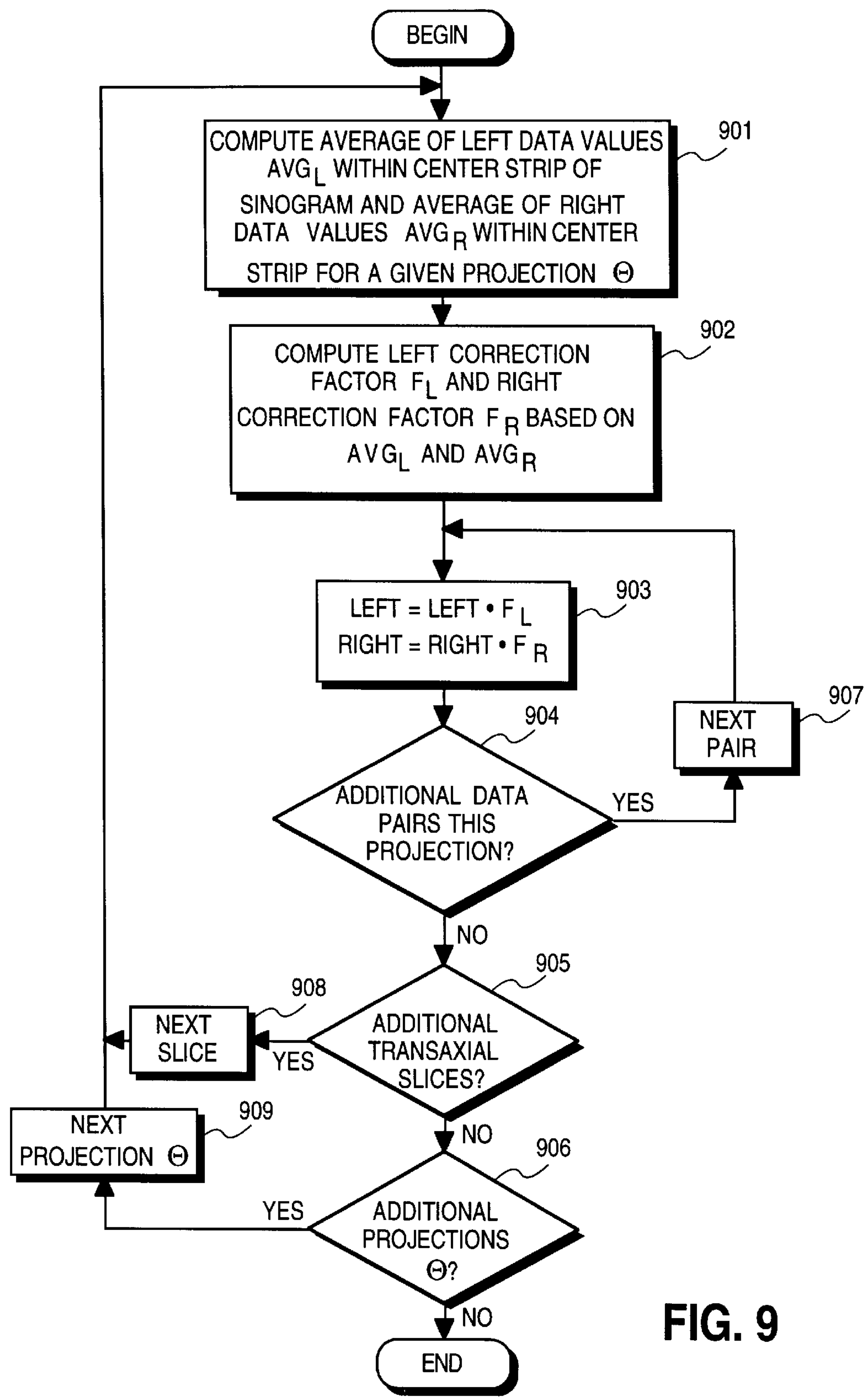
FIG. 9 is a flow diagram illustrating a routine for correcting discontinuities in acquired transmission data.

In accordance with one embodiment of the present invention, the discontinuity correction technique described above is applied to all projection data. FIG. 9 illustrates a routine embodying this technique. At 901, for a given projection θ, the processing system 18 computes an average of the data values within the center strip 63 of the sinogram 56 which result from detector rotations defined as left side angles (i.e., the left side of the sinogram). This average is designated as the left average $AVG_L$. Also at 901, the processing system 18 computes an average of data values within the center strip 63 of the sinogram 56 which result from detector rotations defined as right side angles. This average is designated as the right average $AVG_R$. Note that if one transaxial slice does not provide enough center strip data to be statistically significant, multiple transaxial slices can be averaged together for purposes of computing these averages.

Since corresponding left and right data values represent the same object density, such data values should be the same. In this context, "corresponding" left and right data values are horizontally-aligned data values on each side of the centerline 60 and equidistant from the centerline 60. For example, point 65 in FIG. 9 represents a left data value, while point 66 represents the corresponding right data value. Due to local deadtime variations, however, corresponding left and right data values may not be the same. The result may be a glitch in the projection, as shown in FIG. 7. Consequently, two correction factors are applied in accordance with the present invention, to correctly align the projection.

Specifically, after computing the averages $AVG_L$ and $AVG_R$, at 902 a left correction factor $F_L$ and a right correction factor $F_R$ are computed based on the averages. The correction factors $F_L$ and $F_R$ are computed so as to move toward the average all corresponding left and right data values, respectively, for the given projection θ. For example, the left correction factor $F_L$ may be computed as $F_L=(AVG_R+AVG_L)/(2\cdot AVG_L)$, while the right correction factor $F_R$ may be computed as $F_R=(AVG_R+AVG_L)/(2\cdot AVG_R)$.

Next, at 903 a left data value LEFT in the given projection θ is multiplied by the left correction factor $F_L$, and a right data value RIGHT in the projection θ is multiplied by the right correction factor $F_R$. The computation of 903 is then repeated for all data values in the given projection θ, per 904 and 907 (i.e., for all data values along a given horizontal line in the sinogram), using the same left and right correction factors for all data values in that projection θ. When all pairs of data values in the projection θ have been adjusted, 901 through 904 are repeated for all transaxial slices, per 905 and 908, including computing new left and right averages $AVG_L$ and $AVG_R$ and new correction factors $F_L$ and $F_R$ for each slice. The foregoing steps are then further repeated for all other projections θ represented in the sinogram (906 and 909). Thus, projection data are effectively scaled based on the proposition that two data values representing the same point should be the same when covered from either of two angles 180 degrees apart. This technique, therefore, corrects for local variations in deadtime along the imaging surface of a detector.

III. Randoms Correction

The present invention also includes a technique for correcting coincidence emission data for randoms. One problem with randoms correction techniques of the prior art is that they fail to take into consideration variations in the size and shape of patients. Accordingly, the technique of the present invention uses the actual patient distribution to perform randoms correction. Further, a basic premise of the present invention is that the randoms fraction $R_f$ may vary even though the singles rates remains constant, due to the distributed radiation source in the object, radiation sources from outside the FOV, the energy window used, and the camera geometry. Hence, randoms correction is also performed as a function of both the singles rate and the coincidence rate. More specifically, both the coincidence rate and the singles rate are used in determining the randoms fraction $R_f$.

As will be described further below, patient projection data P(x, y, θ) is corrected based on a computed randoms distribution R(x, y, θ). The randoms distribution R(x,y,θ) is computed as a function of a measured randoms profile $R_0(x, y, \theta)$ and a randoms fraction $R_f(S,C)$. The randoms fraction $R_f(S,C)$ is computed as a function of both the singles rate S and the coincidence rate C for each angle θ. The randoms profile $R_0(x, y, \theta)$ is computed as the convolution of the patient profile P(x, y, θ) with a wide (high σ) Gaussian distribution. This approach therefore differs from randoms corrections techniques of the prior art, which do not take into account the coincidence rate or the object distribution.

Figure 10:
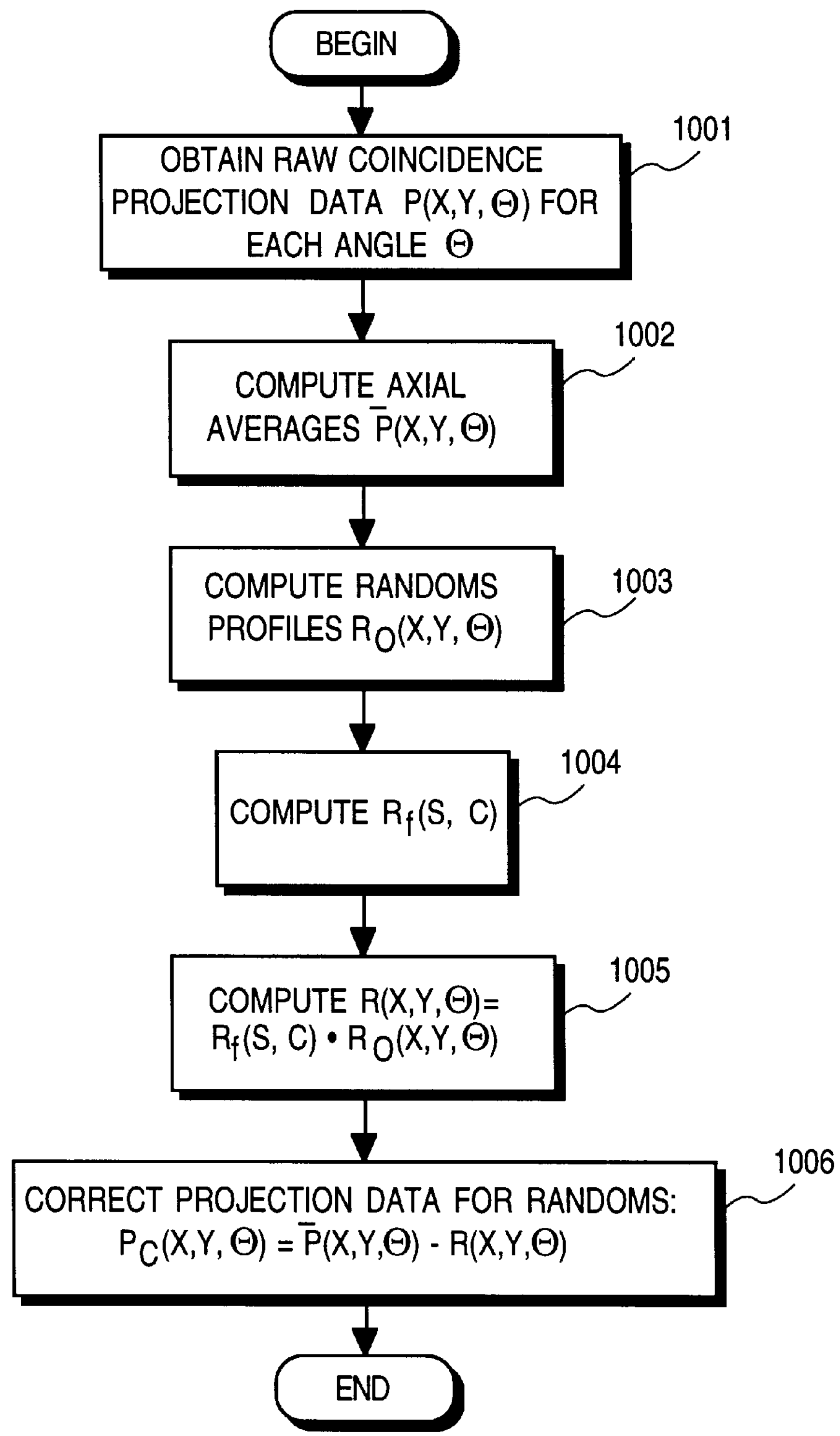
FIG. 10 is a flow diagram illustrating an overall routine for performing randoms correction.

Refer now to FIG. 10, which illustrates an overall routine for performing randoms correction according to the present invention. At 1001, the gamma camera system obtains raw coincidence (emission) projection data P(x, y, θ) for all angles θ. Optionally, at 1002, the gamma camera system computes axial averages $\overline{P}(x, y, \theta)$ of multiple transaxial slices. For example, each axial average $\overline{P}(x, y, \theta)$ may be an average of three (or any other appropriate number of) axially adjacent transaxial slices. Such averaging may be omitted, if desired. At 1003, processing system 18 computes the randoms profiles $R_0(x, y, \theta)$. At 1004, processing system 18 computes the randoms fraction $R_f(S,C)$, where S represents the singles rate for a given angle θ, and C represents the coincidence rate for that angle θ. At 1005, processing system 18 computes a randoms distribution R(x, y, θ) according to equation (6), $$R(x, y, \theta)=R_0(x, y, \theta)\cdot R_f(S,C) \tag{6}$$

At 1006, the processing system 18 corrects the averaged patient projection data $\overline{P}(x, y, \theta)$ for randoms by subtracting the randoms distribution data R(x, y, θ) from the averaged projection data $\overline{P}(x, y, \theta)$ to produce corrected patient projection data $P_c(x,y,\theta)$, as set forth in equation (7).

$$P_c(x, y, \theta)=\overline{P}(x, y, \theta)-R(x, y, \theta) \tag{7}$$

Figure 11:
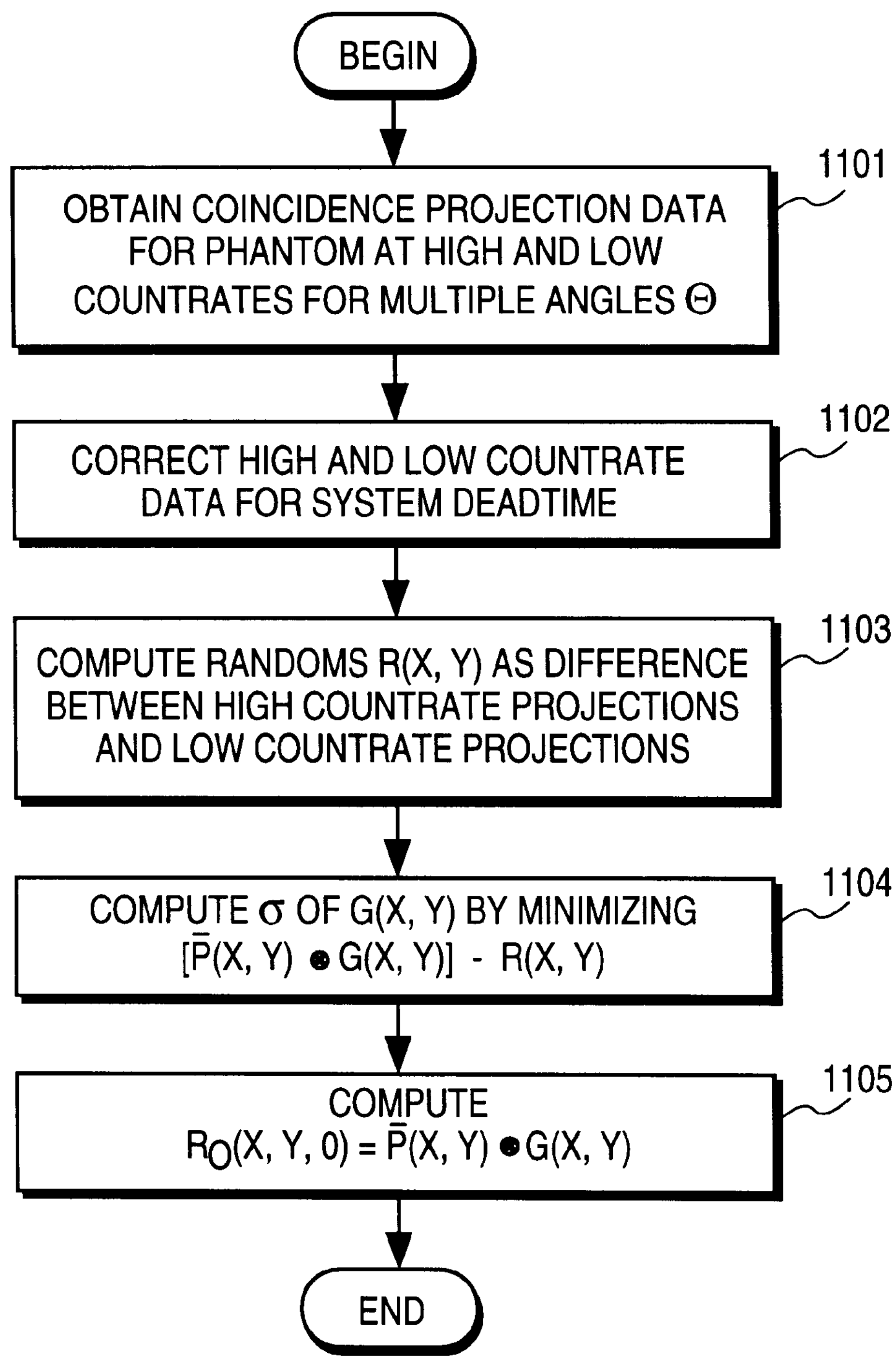
FIG. 11 is a flow diagram illustrating a routine for acquiring randoms profiles as a function of object distribution, in accordance with the routine of FIG. 10.

FIG. 11 illustrates a routine for computing the randoms profiles $R_0(x, y, \theta)$. Note that most of the routine of FIG. 11 is intended to be performed in a pre-clinical test setting, rather than in a clinical setting, as will become clear from the description which follows. The exception is that the final computation of the randoms profile $R_0(x, y, \theta)$ is performed in a clinical setting, i.e., during an imaging session. Thus, at 1101, the gamma camera system is operated to acquire projection data for coincidence activity emitted by a simple phantom, for multiple angles θ, at both high countrate and low countrate. A simple right-cylindrical phantom is believed to be suitable. In this context, "low" countrate is a countrate at which randoms are negligible (e.g., below one percent of the total coincidence events). Next, at 1102 the acquired high and low countrate datasets are each corrected for system deadtime using any suitable deadtime correction technique, such as the technique described above. Next, at 1103 randoms R(x,y) are computed as the difference between the high countrate projection data and the low countrate projection data for a given angle θ. At 1104 the σ value of the above-mentioned Gaussian function is computed. The Gaussian function is defined according to equation (8) and is a well-known mathematical function.

$$G(x, y)=\frac{1}{\sqrt{2\pi\sigma}}\cdot e^{-x^2/2\sigma^2} \tag{8}$$

The σ value is computed by minimizing the difference between the randoms distribution R(x,y) and the convolution of the projection data from the high countrate phantom and the Gaussian G(x,y), i.e., by minimizing $((P(x,y)\otimes G(x,y))-R(x,y))$. A simple curve fit procedure can be employed using, for example a chi-square or a least squares approach. For an imaging system such as described above, a σ value of $200/\sqrt{2}$ is currently believed to be appropriate, according to one embodiment.

The final aspect of determining the randoms profile $R_0(x, y, \theta)$ is performed in the clinical setting, based on the patient projection data. More specifically, at 1105 the randoms profile $R_0(x, y, \theta)$ is computed as the convolution of the axially averaged projection data $\overline{P}(x, y, \theta)$ and the Gaussian distribution G(x,y), using the σ value computed as described above, as set forth in equation (9).

$$R_0(x,y,\theta)=\overline{P}(x,y,\theta)\otimes G(x,y) \tag{9}$$

Figure 12:
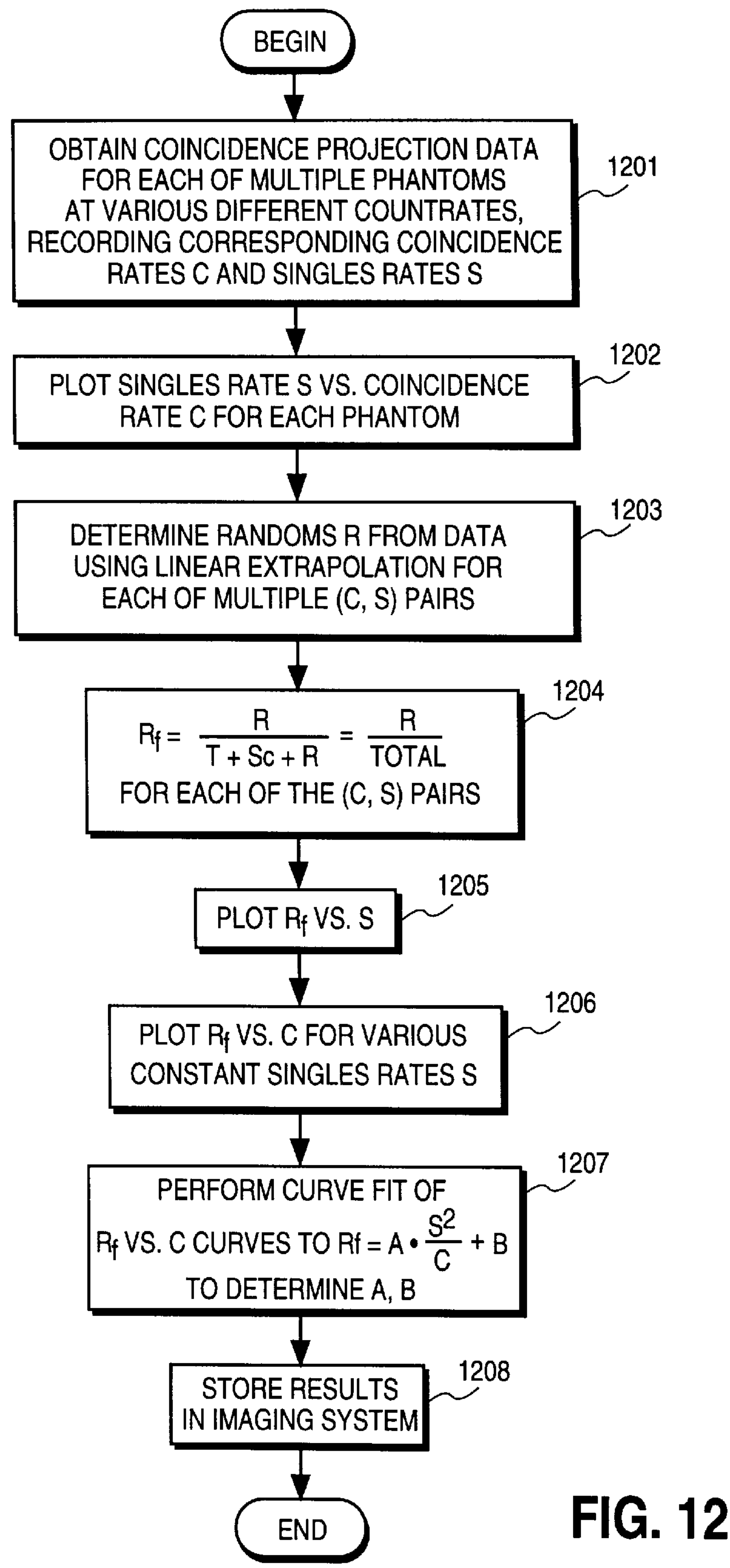
FIG. 12 is a flow diagram illustrating a routine for acquiring a randoms fraction as a function of both singles and coincidence countrates, in accordance with the routine of FIG. 10.

FIG. 12 illustrates a routine for computing the randoms fraction $R_f$ as a function of both singles rate S and coincidence rate C, according to one embodiment. Note that the routine of FIG. 12 is intended to be performed in a pre-clinical setting. At 1201, the gamma camera system is operated to obtain coincidence projection emission data for each of multiple phantoms at various different countrates.

Corresponding coincidence rates C and singles rates S are recorded during the data acquisition process. The phantoms are selected to fairly represent a wide range of patient body sizes and shapes. In one embodiment, three right-cylindrical phantoms of varying sizes are used. At 1202, the singles rates S and corresponding coincidence rates C are plotted for each phantom. FIG. 14 shows an example of three C vs. S plots 81, 82 and 83, corresponding to three different phantoms. At 1203, a randoms distribution R is determined from the data for each of multiple (C,S) pairs by using a linear extrapolation, as will now be described with reference to FIG. 13.

Figure 13:
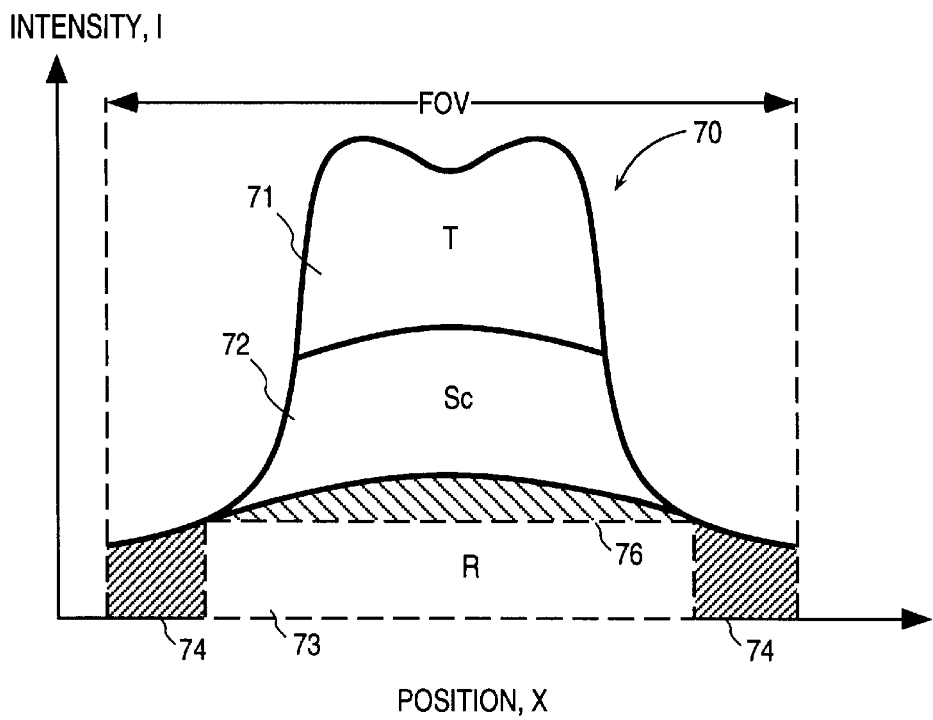
FIG. 13 illustrates projection data of an object, including true coincidences, scatter and random coincidences.
Figure 14:
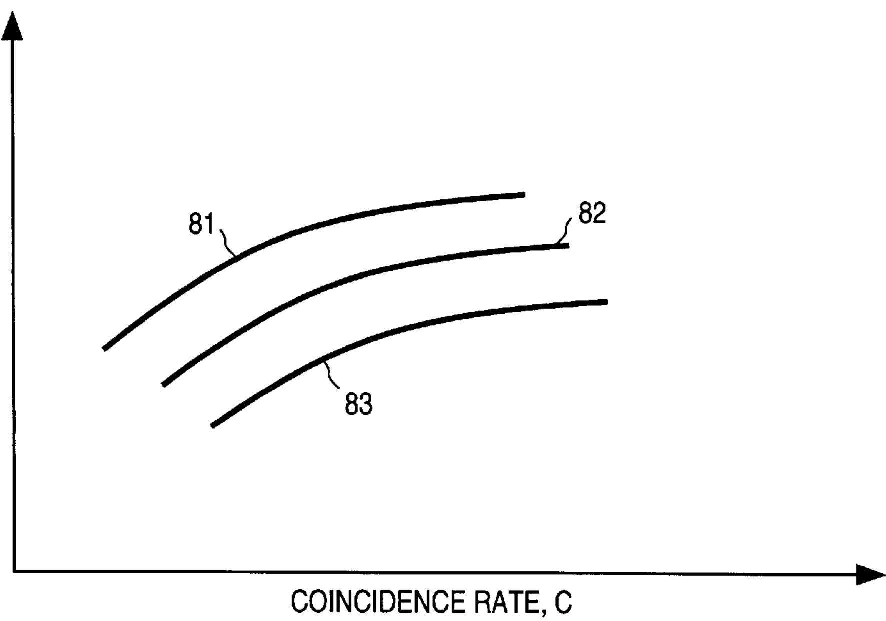
FIG. 14 illustrates three plots of singles rate versus coincidence rate, each corresponding to a different phantom.

FIG. 13 illustrates a plot 70 of projection data taken from a cylindrical phantom from a given projection angle θ. The overall intensity I (i.e., total number of counts) detected can be represented as the sum of all detected true coincidences T, all detected scatter coincidence Sc, and all detected randoms R. Thus, portion 73 of plot 70 represents the contribution of randoms R, portion 72 represents the contribution of scatter Sc, and portion 71 represents the contribution of true coincidences T. At 1203, above, portion 73 representing the contribution from randoms is approximated using a linear extrapolation. More specifically, coincidence events are measured at the perimeter of the FOV, represented by shaded regions 74 under curve 70. The height of regions 74 at their innermost boundaries is linearly extrapolated across the face of the detector, as represented by line 76 in FIG. 13. Thus, the area of curve 70 which falls below line 76 approximates the total number of counts due to randoms. Note that this approximation does not account for a small fraction of the contribution of randoms, which is represented by the shaded area above line 76 under curve 70. However, in another embodiment, to be discussed below, the randoms fraction $R_f$ may be computed in a manner which avoids this type of approximation error. Further, even if the randoms fraction $R_f$ is underestimated, the shape of the randoms profile computed from equation (9) is not affected by such error.

Thus, at 1203 the randoms R are determined for each of multiple (C,S) pairs using this linear extrapolation. The randoms fraction $R_f$ is then computed by dividing the randoms R by the total number of counts for each of the (C,S) pairs. The randoms fraction $R_f$ is then plotted against singles rate S at 1205, and at 1206, the randoms fraction $R_f$ is plotted against coincidence rate C for various constant singles rates S. At 1207, the $R_f$ versus C curves are fitted to equation (10) to determine the coefficients A and B.

$$R_f = A \cdot S^2/C + B \tag{10}$$

In one embodiment of the present invention, the values $A=1.09\times10^{-5}$ 1/kcps and B=0.19 are believed to be appropriate for a system such as described above. Note, however, that these coefficients may be different for other embodiments due to many factors, such as the specific design of the imaging system to be used.

Finally, at 1208 equation (10) with the computed coefficients A and B is stored in any suitable form within the gamma camera imaging system, for use during an imaging session. Equation (10) is then applied during the imaging of a patient to compute $R_f$ for various different angles θ, based on the measured singles and coincidence rates. More specifically, computed $R_f$ values are used to determine the overall randoms distribution R(x, y, θ) according to equation (6), which is used to correct the patient projection data $P_c$(x, y, θ) according to equation (7).

It is believed that, at low countrates, the formula of equation (10) may overcorrect under count-poor conditions. Accordingly, an alternative formula for $R_f$ may be used when the singles countrate falls below a threshold countrate. The formula of equation (11), for example, may be suitable for countrates below 450 kcps for a gamma camera system such as described above.

$$R_f = \frac{S}{400} \cdot (0.34 - 4.52\times10^{-3} \cdot C) \tag{11}$$

Figure 15A:
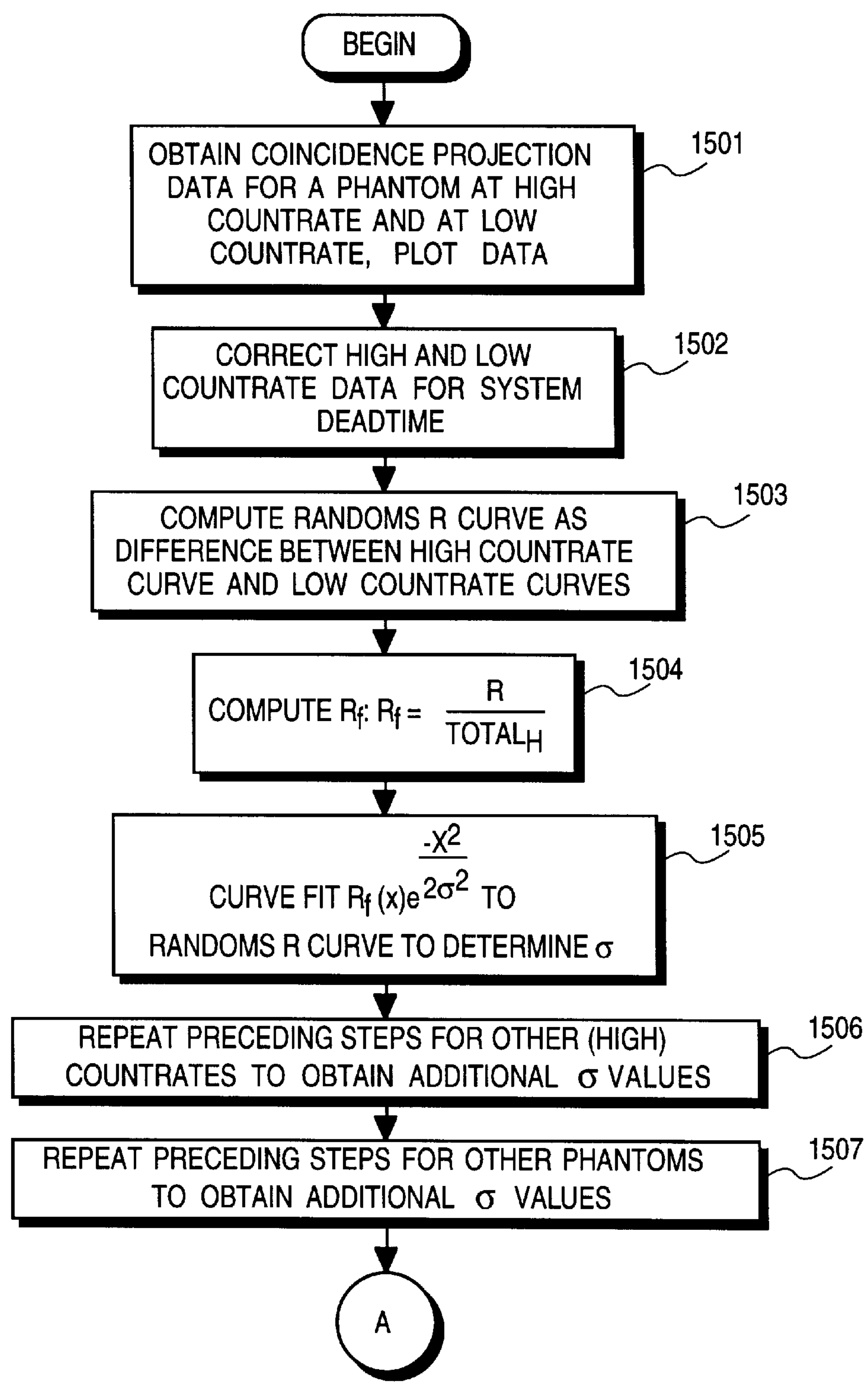
FIGS. 15A and 15B are a flow diagram illustrating an alternative routine for obtaining a randoms fraction.
Figure 15B:
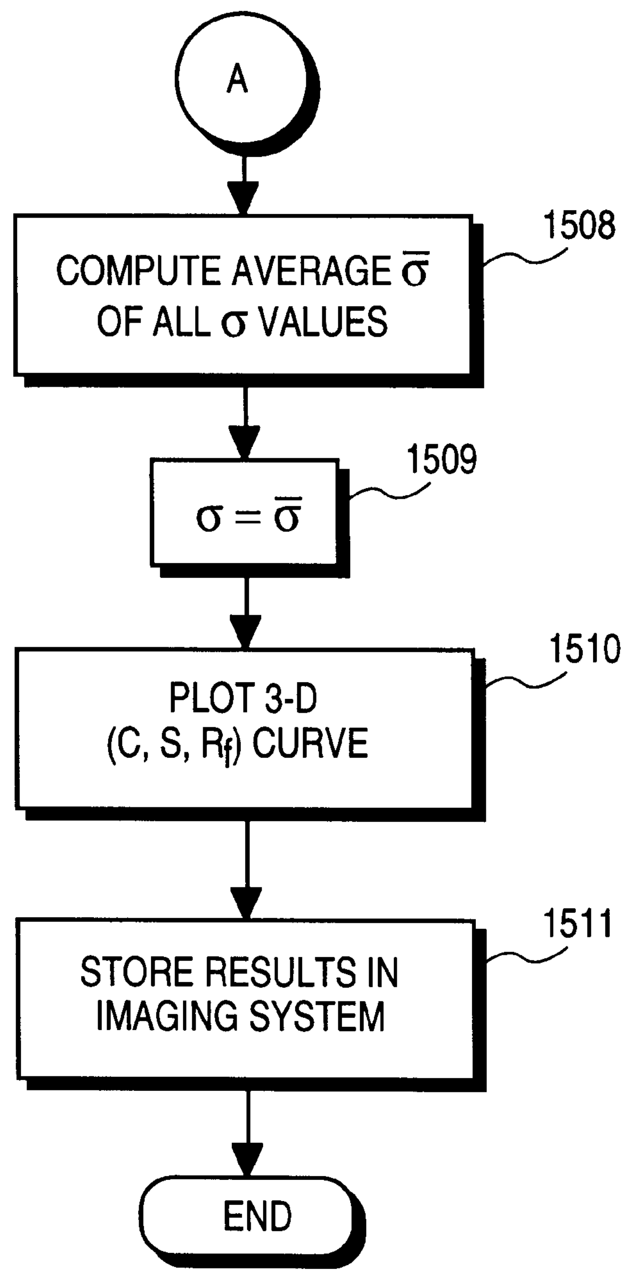

As noted above, the foregoing technique for computing the randoms fraction $R_f$ may underestimate the total randoms R as a result of the linear extrapolation. Therefore, FIGS. 15A and 15B collectively illustrate an alternative routine for computing the randoms fraction $R_f$, which avoids this approximation and which also may provide a more accurate σ value for the Gaussian function G(x,y). At 1501, the gamma camera system is operated to obtain coincidence (emission) projection data of a phantom at both high countrate and at low countrate. The data is then plotted. As noted above, low countrate in this context refers to a countrate at which the randoms are negligible, such as 100 kcps or below. Next, at 1502 the high and low countrate data are corrected for system deadtime. At 1503, a randoms curve is computed as the difference between the high countrate projection data and the low countrate projection data. At 1504, the randoms fraction $R_f$ is computed by dividing the total number of counts R under the randoms curve by the total number of counts under the high countrate curve $Total_H$. At 1505, the computed randoms curve is fitted to equation (12) in order to determine the value of σ. A chi-square or least squares curve fit may be used. Note that the $R_f$ values are summed before performing the curve fit.

$$R = R_f(x) e^{-x^2/2\sigma^2} \tag{12}$$

The preceding steps are then repeated for other countrates to obtain additional σ values (1506). The foregoing steps are then further repeated for other phantoms of different sizes to obtain additional σ values (1507). Next, at 1508, the average σ value $\overline{\sigma}$ is computed for all the previously determined σ values, and at 1509 the average $\overline{\sigma}$ is taken to be the final σ value of the Gaussian function G(x,y). At 1510, a three-dimensional plot of C vs. S vs. $R_f$ is computed from the acquired data, and at 1511 the plot is stored in any suitable form in the imaging system, for later use during an imaging system (i.e., for computation of $R_f$). For example, the plot may be stored in the form of a look-up table.

IV. Dual-Use Transmission Source

As noted above, the transmission point sources 16 of the above-described imaging system may be Cs-137 sources, which transmit radiation with a photopeak at 662 keV. A Cs-137 point source has been found to be desirable for performing transmission scans for correction of PET data in such a system. Because the 662 keV photopeak of Cs-137 is close to the 511 keV photopeak of flourodeoxyglucose (FDG), a common PET radio-pharmaceutical, but not so close as to cause excessive energy level overlap, minimal energy level scaling of the transmission map is required. Further, because the 662 keV photopeak of Cs-137 is higher than the FDG photopeak, contamination due to scatter into the transmission image is reduced. In addition, the 662 keV photopeak of Cs-137 is sufficiently high as to enable the majority of the transmitted gamma rays to completely penetrate most general-purpose nuclear medicine collimators. This characteristic also makes the use of Cs-137 advantageous for performing transmission scans to correct SPECT data, as will now be discussed.

Figure 16:
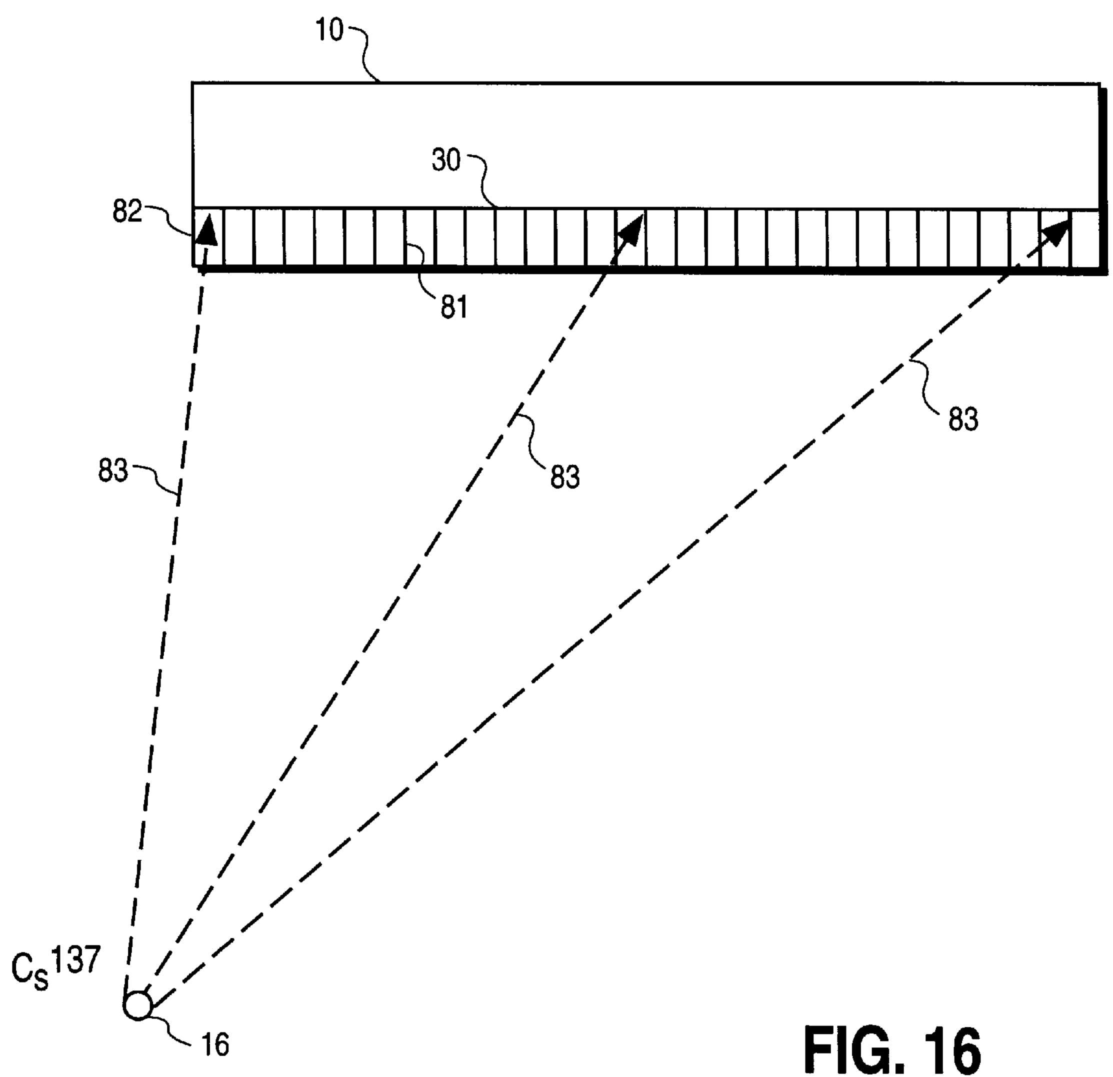
FIG. 16 illustrates a gamma ray detector fitted with a parallel hole collimator and gamma rays from a Cs-137 point source penetrating the septa of the collimator.

Gamma ray detectors are typically collimated during SPECT imaging, and parallel-hole collimators are commonly used. FIG. 16 illustrates a parallel-hole collimator 82 coupled to the imaging surface 30 of one of the detectors 10. The collimator 82 includes a number of lead septa 81, which define the parallel holes. FIG. 16 further illustrates gamma rays 83 from the Cs-137 transmission source 16 penetrating the septa 81 of collimator 82 to reach the imaging surface 30 of the detector 10. As noted above, certain prior art systems use line sources, which are scanned directly across the FOV of the corresponding detectors. Such a technique allows a substantial number of the transmitted photons to pass through the holes of the collimator to the detector, since the paths of many of the transmitted photons are parallel to the holes of the collimator. Therefore, there is no need to remove the collimator for the transmission scan in such a system.

For various reasons, however, it may desirable to use a transmission source configuration in which the sources remain outside the FOV during the transmission scan, as in the above-described system (see FIG. 4). As result, the transmitted gamma rays will impinge upon the collimator at an acute angle, as shown in FIG. 16. In such a system, if a standard singles transmission source (i.e., a source with a photopeak substantially below 662 keV) were used with a standard SPECT collimator, few (if any) of the transmitted photons would pass through the collimator to the detector, due to the incident angle of the photons relative to the holes of the collimator. Rather, most of the photons would be absorbed by the septa of the collimator. Removal of the collimator would therefore be required prior to performing a transmission scan, which can be time-consuming and difficult.

However, by using a 662 keV Cs-137 transmission source in accordance with the present invention, a high percentage (generally, at least 50%) of the transmitted photons impinging upon the collimator will completely penetrate the septa to reach the imaging surface when using a general-purpose nuclear medicine collimator (except for a 511 keV collimator). Collimators with energy ratings below 300 keV are believed to be preferable, however, to increase photon penetration. Penetration of 50% or more is sufficient to generate a high-quality transmission map of the patient for correcting SPECT data using current data processing techniques. Thus, by using a Cs-137 transmission source, removal of the collimator is not necessary prior to performing a transmission scan for correcting SPECT data. Note that the reconstructed transmission map must be scaled appropriately to match the energy level of the single-photon emission source. Techniques for performing such scaling are well known to those skilled in the art.

Thus, a method and apparatus for correcting for random coincidences in a gamma camera imaging system have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of correcting for random coincidences in an imaging system, the method comprising:

acquiring data for generating an image of an object by detecting radiation from the object, including detecting coincidence events, the data including an object profile of the object;

generating random coincidence data based on the object profile and a substantially Gaussian function; and correcting the data for generating the image based on the random coincidence data.

2. A method according to claim 1, wherein the method further comprises:

measuring a singles rate and a coincidence rate associated with the detected radiation; and generating the random coincidence data further based on both the singles rate and the coincidence rate.

3. A method according to claim 2, wherein measuring the singles rate and the coincidence rate comprises measuring the singles rate and the coincidence rate for a plurality of projection angles.

4. A method of correcting for random coincidences in an imaging system, the method comprising:

acquiring data for generating an image of an object by detecting radiation from the object, including detecting coincidence events;

determining an object distribution based on the detected coincidence events;

generating random coincidence data based on the object distribution and a substantially Gaussian function; and correcting the data for generating the image based on the random coincidence data.

5. A method according to claim 4, wherein the method further comprises measuring a singles rate and a coincidence rate associated with the radiation, wherein generating the random coincidence data comprises generating the random coincidence data based on the object distribution, the measured singles rate, and the measured coincidence rate.

6. A method of correcting for random coincidences in a gamma camera imaging system, the method comprising:

detecting gamma radiation emitted from an object to be imaged, including detecting a plurality of coincidence events;

measuring a singles rate and a coincidence rate associated with the emitted radiation;

generating coincidence projection data corresponding to an object profile based on the detected coincidence events;

determining a randoms distribution representing random coincidences in the detected coincidence events by:

computing a randoms profile based on the object profile, including computing the randoms profile as a convolution of the object profile and a substantially Gaussian function;

computing a randoms fraction for each of the projection angles based on the measured singles rate and the measured coincidence rate; and determining the randoms distribution based on the randoms profile and the randoms fraction for each of the projection angles;

correcting the coincidence projection data based on the randoms distribution; and generating images of the object based on the corrected coincidence projection data.

7. A method according to claim 6, wherein measuring the singles rate and the coincidence rate comprises measuring the singles rate and the coincidence rate for a plurality of projection angles.

8. A method of correcting for random coincidences in a gamma camera imaging system, the method comprising:

detecting gamma radiation emitted from an object to be imaged, including detecting a plurality of coincidence events;

measuring a singles rate and a coincidence rate associated with the emitted radiation for each of a plurality of projection angles;

generating coincidence projection data representing an object profile based on the detected coincidence events;

determining a randoms distribution representing random coincidences in the detected coincidence events, including:

computing a randoms profile based on the object profile, including computing the randoms profile as a convolution of the object profile and a Gaussian function;

computing a randoms fraction for each of the projection angles based on the measured singles rate and the measured coincidence rate; and determining the randoms distribution based on the randoms profile and the randoms fraction for each of the projection angles;

correcting the coincidence projection data based on the randoms distribution; and generating images of the object based on the corrected coincidence projection data.

9. A medical imaging system comprising:

a gantry;

a plurality of radiation detectors supported by the gantry;

a processing system configured to control the detectors;

means for acquiring data for generating an image of an object by detecting radiation from the object with the radiation detectors, including means for detecting coincidence events;

means for generating an object profile based on the coincidence events;

means for measuring a singles rate and a coincidence rate associated with the detected radiation;

means for generating random coincidence data based on the object profile, the singles rate, the coincidence rate, and a substantially Gaussian function; and means for correcting the image data for generating the image for random coincidences based on the random coincidence data.

10. A medical imaging system according to claim 9, wherein the means for measuring the singles rate and the coincidence rate comprises means for measuring the singles rate and the coincidence rate for a plurality of projection angles.

11. An apparatus for correcting for random coincidences in a medical imaging system, the apparatus comprising:

means for acquiring data for generating an image of an object by detecting radiation from the object, including means for detecting coincidence events;

means for determining an object distribution based on the detected coincidence events;

means for generating random coincidence data based on the object distribution and a Gaussian function; and means for correcting the data for generating the image based on the random coincidence data.

12. An apparatus according to claim 11, further comprising means for measuring a singles rate and a coincidence rate associated with the radiation, wherein the means for generating the random coincidence data comprises means for generating the random coincidence data based on the object distribution, the measured singles rate, and the measured coincidence rate.

13. A gamma camera imaging system comprising:

a gantry;

a plurality of gamma radiation detectors supported by the gantry;

a processing system coupled to the radiation detectors and the gantry, the computer system configured to control the radiation detectors and the gantry to generate tomographic images of an object, the processing system configured to:

control the detectors to detect gamma radiation emitted from the object, including detecting a plurality of coincidence events;

measure a singles rate and a coincidence rate associated with the emitted radiation;

generate coincidence projection data corresponding to an object profile based on the detected coincidence events;

determine a randoms distribution representing random coincidences in the detected coincidence events based on the object distribution, the measured singles rate, and the measured coincidence rate by:

computing a randoms profile as a convolution of the object profile and a substantially Gaussian function;

computing a randoms fraction for each of the projection angles based on the measured singles rate and the measured coincidence rate; and determining the randoms distribution based on the randoms profile and the randoms fraction for each of the projection angles;

correct the coincidence projection data based on the randoms distribution; and generate the tomographic images of the object based on the corrected coincidence projection data.

14. A gamma camera imaging system according to claim 13, wherein the processing system is further configured to measure the singles rate and the coincidence rate by measuring the singles rate and the coincidence rate for a plurality of projection angles.

* * * * *